United States Patent [19]

Hengstmengel et al.

[11] Patent Number: 4,750,129

[45] Date of Patent: Jun. 7, 1988

[54] METHOD OF CONTROLLING A TRAFFIC CONTROL SYSTEM AND A TRAFFIC CONTROL SYSTEM FOR USE OF THE METHOD

[75] Inventors: Johannes Hengstmengel; Johannes Vis, both of Hilversum, Netherlands

[73] Assignee: U.S. Philips Corporation, New York, N.Y.

[21] Appl. No.: 750,628

[22] Filed: Jul. 1, 1985

[30] Foreign Application Priority Data

Jul. 2, 1984 [NL] Netherlands ........................ 8402094

[51] Int. Cl.[4] ........................................ G06F 15/48

[52] U.S. Cl. ................................ 364/436; 340/910; 340/917

[58] Field of Search ..................... 364/436, 437, 438; 340/909–911, 913, 916–917

[56] References Cited

U.S. PATENT DOCUMENTS

| | | | |
|---|---|---|---|
| 3,397,306 | 8/1968 | Auer, Jr. | 364/437 |
| 4,167,784 | 9/1979 | McReynolds et al. | 364/436 |
| 4,250,483 | 2/1981 | Rubner | 364/900 |
| 4,322,801 | 3/1982 | Williamson et al. | 340/913 |
| 4,370,718 | 1/1983 | Chasek | 364/436 |
| 4,390,951 | 6/1983 | Marcy | 364/437 |

*Primary Examiner*—Errol A. Krass
*Assistant Examiner*—Thomas G. Black
*Attorney, Agent, or Firm*—David R. Treacy; Bernard Franzblau

[57] ABSTRACT

A method of and an arrangement for controlling a traffic control system comprising at least two measuring points located at a mutual distance along a traffic lane. It is determined whether the speed of a vehicle detected at one of the measuring points is less than a predetermined part of a running weighted average speed of vehicles detected in at least both measuring points. This has, inter alia, the disadvantage that a number of alarm signals are unnecessarily generated, which does not promote safety on the road. To obviate this it is determined at a measuring point, located downstream in the traffic direction, of the two above-mentioned measuring points, whether or not the speed of a vehicle detected there is less than a predetermined part of a running weighted average speed, which is exclusively determined from the vehicle speed detected at the upstream measuring point of these two measuring points.

11 Claims, 3 Drawing Sheets

METHOD OF CONTROLLING A TRAFFIC CONTROL SYSTEM AND A TRAFFIC CONTROL SYSTEM FOR USE OF THE METHOD

BACKGROUND OF THE INVENTION

This invention relates to a method of controlling a traffic control system comprising, arranged along a traffic lane, at least two mutually spaced measuring points and a signalling arrangement located between the measuring points, the method comprising the steps of detecting the speeds $V_c$ of vehicles passing the measuring points, determining a running weighted average speed $V_g$ from detected vehicle speeds $V_c$, determining whether a detected vehicle speed is less than a predetermined part of the running weighted average speed $V_g$ and applying an alarm signal to the signalling arrangement when the detected vehicle speed is less than the predetermined part of the running weighted average speed $V_g$.

Such a method is described in the article "Tunnel and motorway supervision system REYERS-Brussels", by D. W. Singleton and H. H. A. Heesterbeek, published in Philips Telecommunication Review, Vol. 32, December 1979, pages 246–257.

The method described in said article is performed with the aid of a central processor. In this processor the vehicle speed $V_c$ detected at a measuring point is compared with a predetermined percentage of a running weighted average speed, composed of vehicle speeds originating from a plurality of consecutive measuring points arranged along a traffic lane.

It has, however, been found that such a method is inaccurate because, on the basis of the above-mentioned criterion, an alarm signal is generated too often. This results in an excessive number of alarm signals to be applied to the signalling arrangement which is a source of irritation for drivers and consequently reduces the traffic safety. In addition, the traffic speed is reduced unnecessarily, which has an adverse effect on the traffic flow.

SUMMARY OF THE INVENTION

An object of the invention is to provide a more accurate method of controlling a traffic control system which is simpler and is suitable for a decentralized structure.

According to the invention, the method is therefor characterized in that the running weighted average speed $V_g(m-1)$ is determined from the vehicle speeds $V_c(m-1)$ detected at the measuring point (m−1), located upstream in the traffic direction of the traffic lane, which is one of two consecutive measuring points (m−1, m) along the traffic lane; and that, to determine whether a detected vehicle speed is less than a predetermined part of a running weighted average speed $V_g$, the speed of a vehicle $V_c(m)$ detected at the downstream measuring point (m) of the two consecutive measuring points (m−1, m) along the traffic lane is compared with the predetermined part of the running weighted average speed $V_g(m-1)$ determined from the vehicle speeds $V_c(m-1)$ detected at the measuring point (m−1), located upstream in the traffic direction of the traffic lane, of the two consecutive measuring points (m−1, m) situated along the traffic lane.

This has the advantage that an alarm signal is produced on the basis of data obtained from vehicles which actually overtake a slower vehicle. Consequently, signals, for example, speed-limiting signals, are only produced by signal display arrangements to warm these overtaking vehicles if there is a real risk of a collision. In addition, the running weighted average speed $V_g(m-1)$ is only calculated from vehicle speeds $V_c(m-1)$ detected at each measuring point, in this case the measuring point (m−1) located upstream. This enables a decentralized control which has the advantage that a faster signal processing can be realized in a simple way, more specifically for a traffic system having a very large number of measuring points. This enables a more adequate reaction to the occurrence of dangerous traffic situations, and traffic safety is increased correspondingly.

In accordance with a preferred embodiment the method comprises the step of determining the running weighted average speed $V_g(m-1)$ in accordance with the expression $$V_g(m-1)=V'_g(m-1)+a[V_c(m-1)-V'_g(m-1)]$$

where $V_g(m-1)$ is the new running weighted average speed to be determined at the upstream measuring point (m−1), $V'_g(m-1)$ is the last determined running weighted average speed of the upstream measuring point (m−1), $V_c(m-1)$ is the speed of a vehicle detected at the upstream measuring point (m−1) and a is a weighting factor to be selected. This has the advantage that because of the choice of the quantity a the influence of a detected vehicle speed $V_c(m-1)$ deviating from the running weighted average speed $V_g(m-1)$ can be easily adjusted to the running weighted average speed and can be adapted experimentally.

In accordance with a further preferred embodiment the method comprises the step of determining the predetermined part G(p) of the running weighted average speed $V_g(m-1)$ in accordance with the expression $$G(p).V_g(m-1)=F(p).V_g(m-1)/(8+M/100)$$

wherein F(p) is an adjustable multiplying factor to be selected, M is the distance between two consecutive measuring points (m−1, m) in meters and $V_g(m-1)$ is the running weighted average speed determined from the vehicle speeds $V_c(m-1)$ detected at the measuring point (m−1), located upstream in the traffic direction in the traffic lane, of the two consecutive measuring points (m−1, m) arranged along the traffic lane.

This has the advantage that upon determining the occurrence of a dangerous traffic situation, it is possible to have this situation depend on further ambient and traffic situations by the choice of the multiplying factor F(p), and that the distance between the two consecutive measuring points is also considered.

In accordance with a preferred embodiment, the method of controlling a traffic control system which includes at least a third measuring point (m+1), located downstream relative to said two measuring points (m−1, m) along the traffic lane, comprises the steps of incrementing a counting position T(p) by one unit, as long as a maximum counting position has not yet been reached, if an alarm signal is produced because of the fact that a vehicle speed $V_c(m+1)$ detected at the third measuring point (m+1) is less than a predetermined part G(p) of the running weighted average speed $V_g(m)$ determined from the vehicle speeds $V_c(m)$ detected in the downstream measuring point (m) of said two consecutive measuring points (m−1, m) arranged along the traffic lane, decrementing the counting position T(p) by one unit as long as a minimum counting position has not yet been reached, if a predetermined period of time $\tau$ has elapsed after the last alarm signal or the change in the counting position have been produced, and setting the predetermined part G(p) to predetermined values by adjusting the multiplying factor F(p) to an individual value added to each counting position T(p).

This provides a control technique which entirely anticipates all possible traffic situations, while maintaining the option of a decentralized control.

BRIEF DESCRIPTION OF THE DRAWING

The invention and its advantages will now be described in greater detail, by way of example, with reference to the embodiments shown in the accompanying drawing, corresponding components being given the same reference numerals. In the drawing.

DESCRIPTION OF THE PREFERRED EMBODIMENTS

Figure 1:
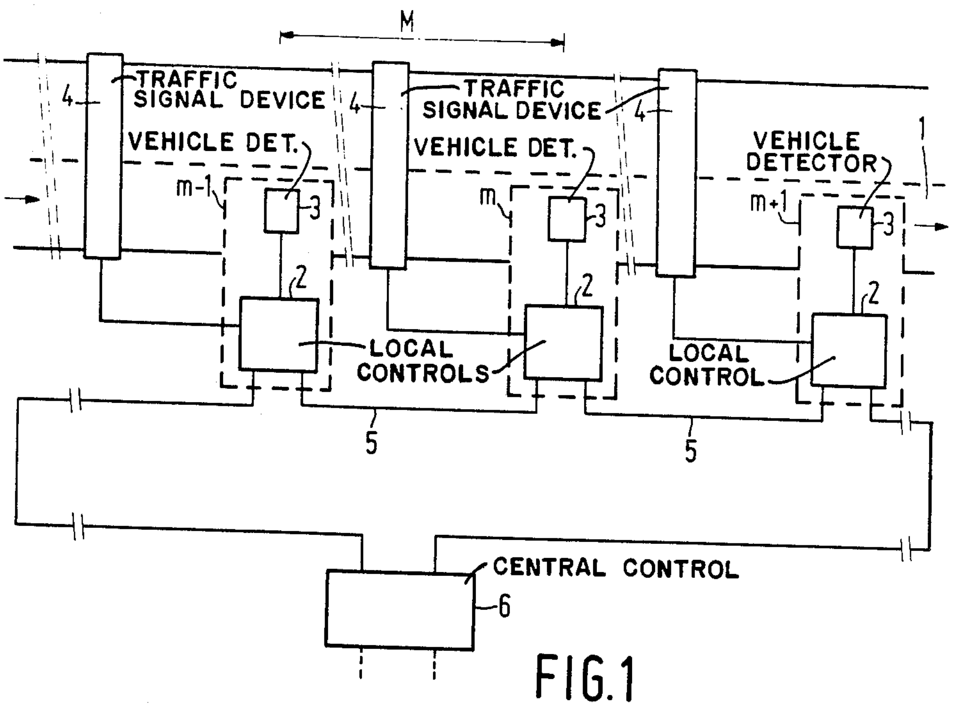
FIG. 1 shows a block circuit diagram of a traffic control system according to the invention.

FIG. 1 shows a portion of a traffic control system arranged along a traffic lane 1 of, for example, a motorway, a tunnel or a viaduct. Such a traffic control system comprises a number n of mutually spaced measuring points along the traffic lane 1, where n=2, 3, . . . m−1, m, m+1, . . . N. The Figure shows the measuring points m−1, m and m+1. The distance M between consecutive measuring points is 100 to 2000 meters, depending on the road pattern and the associated maximum permissible vehicle speeds.

In this embodiment, each measuring point comprises a local control arrangement 2 and a vehicle detector 3 connected thereto. The control arrangement 2 determines, in a manner still further to be described, from the signal supplied by the vehicle detector 3 whether or not dangerous traffic situations arise. At the occurrence of such a dangerous traffic situation the relevant control arrangement 2 applies an alarm signal to a traffic signalling arrangement 4 connected to said control arrangement. These signalling arrangements 4 are provided for the benefit of the relevant traffic lane 1 and are located at a measuring point. In this embodiment, each signalling arrangement 4 is also connected to the local control arrangement 2 of the measuring point which is located downstream in the traffic direction indicated by an arrow. The signalling arrangement 4 is, for example, a traffic light, a traffic lane indicator, a flashing orange light, an overhead warning sign with or without text or a combination of two or more of such arrangements. Thus, both red traffic lights and a sign bearing the text "STOP MOTOR" can light up when, for example, traffic has come to standstill in a tunnel, etc.

The local control arrangements 2 are connected to a ring conductor 5 of a Local Area Network with a "token access protocol" for the mutual exchange of signals. Such LAN's are generally known, see for example the article "Local Area Networks" by M. G. Rowlands, published in the periodical British Telecommunications Engineering, Vol. 2, April 1983, pages 6–11 of the periodical "Data bus" September 1983, etc. Together with the ring conductor 5, the local control arrangement 2 forms a signal processing arrangement. This signal processing arrangement can be connected to a central control arrangement 6 for operation in conjunction with further signal processing arrangements and other traffic rules and supervising equipment. It is of course alternatively possible to connect the vehicle detectors 3 and the signalling arrangement 4 directly to the central control arrangement 6 and to have this arrangement perform all the operations centrally. However, the decentralized form of control shown has the advantage that when dangerous traffic situations occur, a faster and consequently more adequate response is possible.

Figure 2:
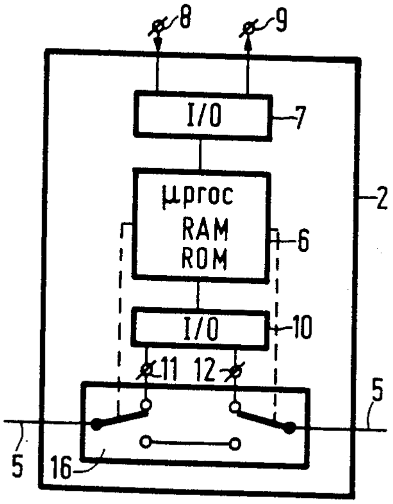
FIG. 2 shows a block circuit diagram of a local control arrangement for use in the block circuit diagram of FIG. 1.

The structure of a local control arrangement 2 is shown block-schematically in FIG. 2. Each local control arrangement 2 comprises a $\mu$-processor 6, for example a Z8000, comprising a first input and output circuit 7 having an input 8 connected to a vehicle detector 3, an output 9 connected to a traffic signalling arrangement 4 and a second input and output circuit 10 connected to a switch 16 of the LAN via an input 11 and an output 12. Under the control of the $\mu$-processor, switch 16 can be adjusted in known manner to two positions. In the position shown in FIG. 2 information intended for the local control arrangement 2 of ring conductor 5 can be taken off therefrom or applied thereto. In the other position the information stream bypasses the local control arrangement.

Figure 3:
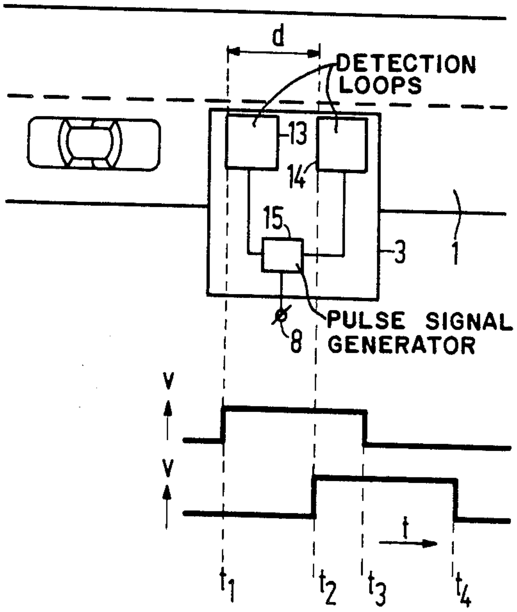
FIG. 3 shows a detector for use in the block circuit diagram of FIG. 1, and FIGS. 4*a* and 4*b* are flow charts of the method according to the invention as illustrated in the block circuit diagrams of FIGS. 1 and 2.

FIG. 3 shows an example of a vehicle detector 3. This vehicle detector 3 comprises two detection loops 13 and 14 which are provided in the road surface of the traffic lane 1 at a mutual distance d from each other in the traffic direction. The distance d, which normally is 4 meters, has been chosen so that it is impossible for two vehicles to be simultaneously present in this area. In addition, the detector comprises a module 15 to which the loops 13, 14 are connected and which, when a vehicle passes the loops produces in known manner one pulse signal per loop, the pulse duration of which corresponds to the time a vehicle is present over the relevant loop 13, 14. Such a vehicle detector 3 is generally known and is marketed, for example, as an "integrated detector" No86AA204.

The signals produced by the module 15 when a vehicle passes the loops 13, 14 are also shown in FIG. 3. The local control arrangements 2 sample their input 8 for example every 10 msec.

The operation of the local arrangement 2 will now be described in greater detail with reference to the flowchart shown in FIG. 4*a*.

Figure 4A:
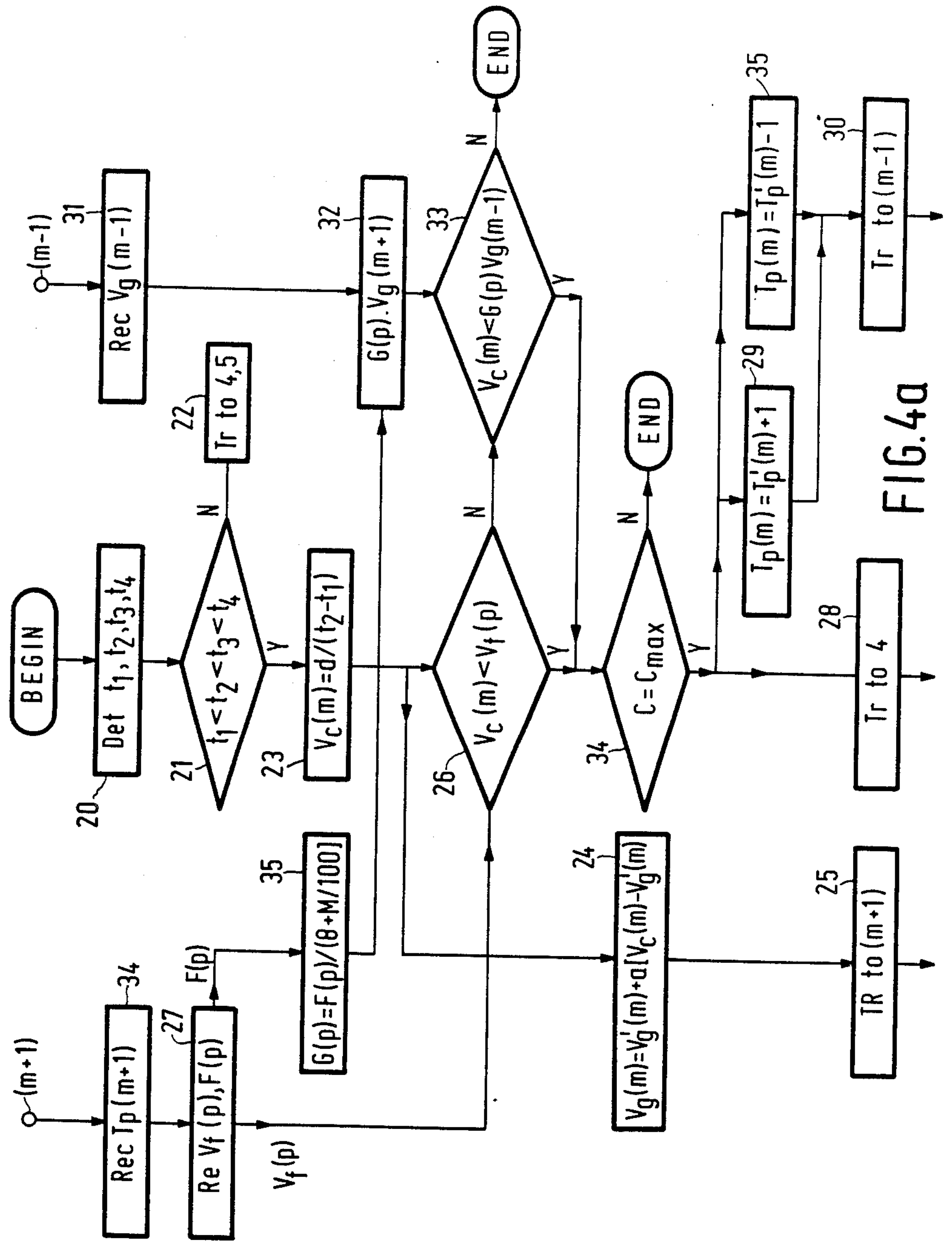
Figure 4B:
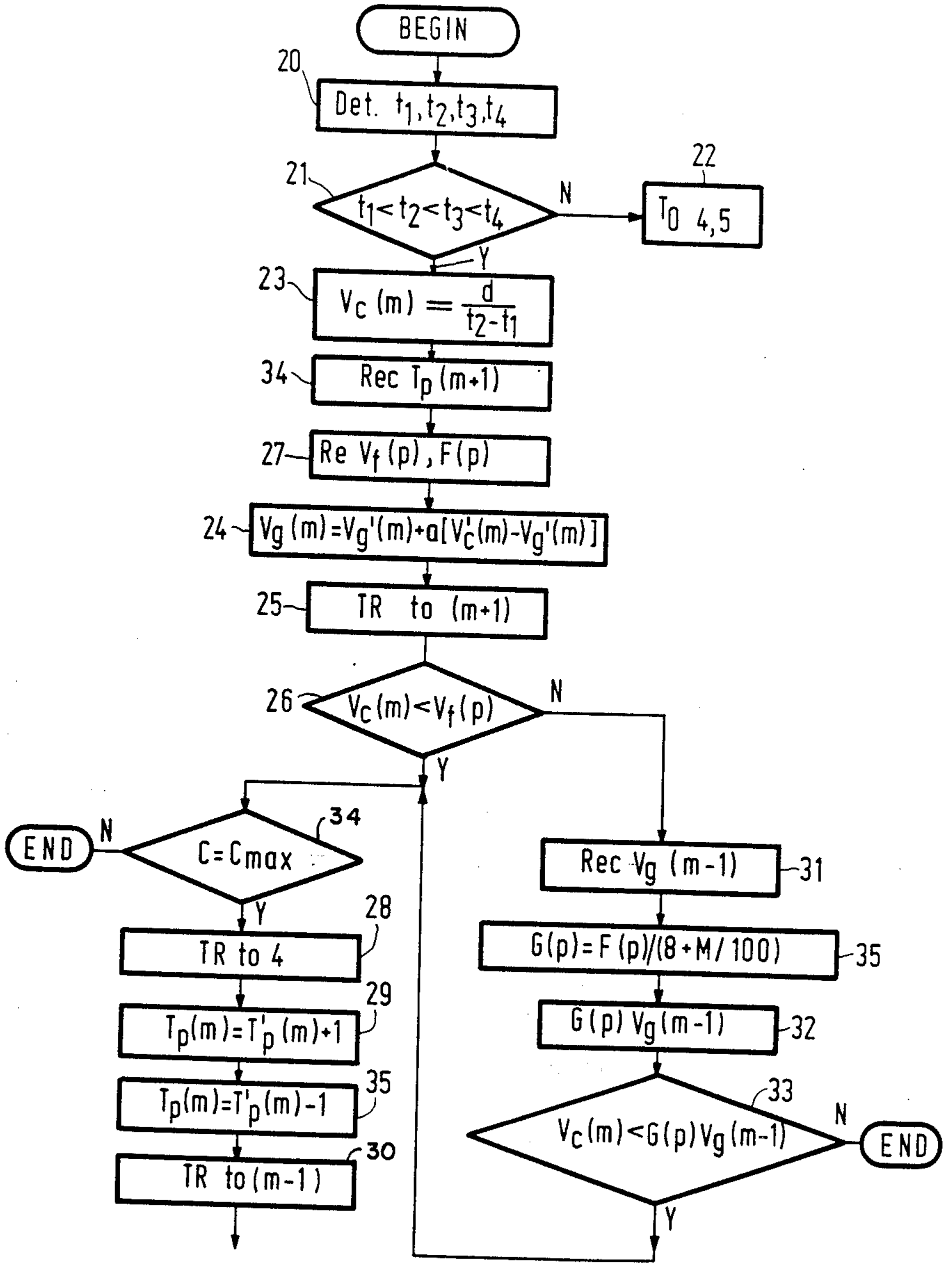

For clarity of the method, the flowchart of FIG. 4*a* has been arranged such that process steps of the method at a measuring point m, which steps are carried out in response to signals originating from or intended for the measuring points m−1 located upstream from m or the measuring point m+1 located downstream, as the case may be, are shown in parallel columns. Since a logic signal processing arrangement can only operate time-sequentially, FIG. 4*b* shows the corresponding flow chart for such an arrangement, the identically numbered blocks and decision diamonds of FIGS. 4*a* and 4*b* representing identical process steps.

If, for example, the local control arrangement 2 of measuring point m receives signals from the detector 3, the instants $t_1$, $t_2$, $t_3$ and $t_4$ shown in FIG. 3 are determined first, as is shown in block 20 in FIG. 4*a* denoted by Det $t_1$, $t_2$, $t_3$, $t_4$.

Thereafter it is determined whether the instants $t_1$ to $t_4$ have an increasing value by checking whether $t_1 < t_2 < t_3 < t_4$, see decision diamond 21. Acting thus it is ascertained whether the vehicle is moving in the direction indicated for the traffic lane 1. If in accordance with the N-branch of the decision diamond 21 this requirement is not satisfied, then an alarm signal is applied to the relevant signalling arrangement 4 in accordance with block 22 (denoted by To 4, 5) via output 9 and the other measuring points and possibly a central control arrangement 6 coupled thereto are informed via the ring conductor 5.

If the vehicle drives in the prescribed direction then, in accordance with the Y-branch of decision diamond 21 the procedure shown in block 23 is performed. In this procedure the speed $V_c(m)$ of the vehicle is determined, more specifically in accordance with the expression $$V_c(m) = \frac{d}{t_2 - t_1} \quad (1)$$

wherein (m) indicates that it is the speed $V_c$ of a vehicle detected at the $m^{th}$ measuring point. In addition to the above-described traffic detectors 3 and the vehicle speeds calculated with the aid of the local control arrangements 2 connected thereto, it is alternatively possible to utilize traffic detectors which directly measure the speed $V_c$ of a passing vehicle, such as a doppler-effect radar detector, and to apply this speed $V_c$ as an input quantity to the relevant local control arrangement 2.

Thereafter, during a procedure represented in block 24, a new running weighted average speed $V_g(m)$ is now determined with the aid of the vehicle speeds $V_c(m)$ now known, in accordance with the expression $$V_g(m) = V'_g(m) + a[V_c(m) - V_g'(m)] \quad (2)$$

wherein

- $V_g(m)$ is the new, running weighted average speed to be determined of vehicles passing that measuring point m,
- $V'_g(m)$ represents the so far valid running weighted average speed of vehicles passing that measuring point m, and
- a is a weighting factor having a previsously arbitrarily chosen value, for example the value a=0.2.

This running weighted average speed $V_g(m)$ is transferred in accordance with block 25 to the local control arrangement 2 of the downstream measuring point m+1 via the ring conductor 5. This is indicated in block 25 by TR to (m+1).

In addition to the preferred determination described here of the running weighted average vehicle speed $V_g$ in accordance with expression (2), it is alternatively possible to use any running weighted average vehicle speed obtained in a different way, such as the average vehicle speed $$V_g(m) = \frac{(k - a) \cdot V'_g(m) + a \cdot V_c(m)}{10} \text{ etc.}$$

However, the best results were obtained using the preferred determination of the running weighted average speed.

After the vehicle speed $V_c$ is determined in accordance with the procedure of block 23, it is determined in accordance with the decision diamond 26 if this speed is less than a predetermined minimum vehicle speed $V_f(p)$. In decision diamond 26 this minimum vehicle speed $V_f(p)$ is denoted by $$V_c(m) < V_f(p) \quad (3)$$

and is made available in a manner still further to be described by the procedure of block 27.

When in accordance with the Y-branch of the decision diamond 26 the above-mentioned condition has been satisfied, the vehicle detected at the measuring point m has too low a speed and constitutes a danger for all the following traffic. To that end, an alarm signal is applied via output 9 to the relevant signalling arrangement 4 to warn the following traffic, using a time monitoring procedure still further to be described and shown in decision diamond 34 in accordance with the procedure of block 28 denoted by Tr to 4. In response to this alarm signal said traffic is, for example, given a speed limit.

On the other hand, in accordance with the procedure of block 29 the counting position $T_p(m)$ of a counter, not shown, is incremented by one unit, provided a maximum counting position $T_p(m)$ is not exceeded. This maximum counting position is defined by the following expression $$T_p(m) = T_p(m) + 1 \quad (4)$$

wherein $T_p(m)$ is the new counting position to be determined for measuring point m, $T_p'(m)$ is the last-determined counting position of the counter for measuring point m and wherein p=1, . . . P.

In accordance with the procedure of block 30, this counting position $T_p(m)$ is transferred via the ring conductor 5 to the measuring point m−1 located upstream.

If, in accordance with the N-branch of decision diamond 26 the condition $V_c(m) < V_f(P)$ is not satisfied, it is checked whether the vehicle speed $V_c(m)$ determined at the measuring point m satisfies the procedure shown in the decision diamond 33.

The further data for performing this procedure are obtained as follows.

In the same way that the new running weight average speed $V_g(m)$ determined at the measuring point m is transferred to the local control arrangement 2 of the measuring point m+1 (see block 25), the new running weighted average speed $V_g(m-1)$ determined at the measuring point m−1 is transferred to the local control arrangement 2 of the measuring point m. The reception of this new running weighted average speed $V_g(m-1)$ by measuring point m is indicated in block 31 by Rec $V_g(m-1)$.

In accordance with the procedure of block 32, this speed $V_g(m-1)$ is multiplied by a weighting factor G(p) which is less than unity. The manner in which this weighting factor is obtained will be further described below. The product $G(p).V_g(m-1)$ thus obtained, which represents a given portion of the running weighted average speed of vehicles at the measuring point m−1 is used for performing the procedure shown in the decision diamond 33.

In accordance with the procedure of this decision diamond 33, it is determined whether a vehicle detected at the measuring point m has a speed $V_c(m)$ which, compared with the running weighted average speed $V_g(m-1)$ of the vehicles detected at the measuring point m−1 is safe or not in accordance with the expression $$V_c(m) < G(p) \cdot V_g(m-1) \quad (5)$$

If the vehicle speed $V_c(m)$ does not satisfy condition (5), no further action is taken in accordance with the N-branch of decision diamond 33.

If condition (5) is indeed satisfied, then there is a danger of collision and in accordance with the Y-branch of decision diamond 33, the same procedure is followed as for the above-described Y-branch of decision circuit 26, that is to say that in accordance with block 28 an alarm is applied to the relevant signalling arrangement 4, the counting position $T_p(m)$ in accordance with block 29 is incremented by one and this new counting position is transferred in accordance with block 30 to the local control 2 of the upstream measuring point m−1.

The new counting position $T_p(m+1)$ of the downstream measuring point m+1 is transferred in an identical way as above to the local control at measuring point m via the ring conductor 5. The reception of a new counting position $T_p(m+1)$ at measuring point m is shown in block 34.

This counting position $T_p(m+1)$ is used as an address for an ROM memory, not shown, coupled to the μ-processor wherein by way of embodiment the following Table is stored.

TABLE

| $T_p(m+1)$ | $V_f(p)$ | F(p) |
|---|---|---|
| 8 | 50 | 8 |
| 7 | 45 | 8 |
| 6 | 40 | 7 |
| 5 | 35 | 7 |
| 4 | 30 | 6 |
| 3 | 25 | 5 |
| 2 | 20 | 4 |
| 1 | 15 | 3 |

In this Table p extends from one to eight. In response to a received counting position $T_p(m+1)$ the memory supplies, as shown in block 27, a minimum vehicle speed $V_f(p)$ which corresponds to that counting position $T_p(m+1)$ for effecting in agreement with decision procedure of decision diamond 26 the operation defined in expression (3) and a multiplying factor F(p) is also supplied for effecting the procedure shown in block 35 in accordance with the expression:

$$G(p) = F(p)/(8 + M/100) \quad (6)$$

wherein G(p) is the previously mentioned weighting factor for the procedure of block 32 and M is the distance in meters between the upstream measuring point m−1 and the measuring point m.

In this way it is accomplished that the conditions for determining whether there is a risk of collision for vehicles passing the measuring point (m−1) with vehicles detected at the measuring point m partly depends on the occurrence of this risk of collision for vehicles passing the downstream measuring point m with a vehicle detected at the measuring point m+1, which thus increases the traffic safety.

The above-described traffic control is consequently an anticipatory measure against an actually occurring risk of collision while, partly because of a centralized control and an associated higher processing rate, the safety on the road is increased in a simple way.

It should be noted that instead of 8 counting positions a larger or a smaller number of counting positions can alternatively be used, optionally in dependence on the amount of traffic or the time of the day. Thus it may happen that only two counting positions per measuring point are used, namely one counting position to which the measuring point is normally adjusted and one if the downstream measuring point has produced an alarm signal.

The alarm signals supplied in accordance with the y-branches of decision diamonds 26 and 33 are processed as follows in the time supervising procedure of decision diamond 34. An alarm signal is, for example, applied under the control of a high-frequency clock signal to a free-running counter whose counting position c is compared as to the procedure of decision diamond 34 to a maximum counting position $c_{max}$. This maximum count is reached after a predetermined period of time, for example after some 60 seconds, if during this time no new alarm signal is supplied as a reset signal. Thus a given delay $\tau$ is realised. When the maximum counting position has been reached, the previous alarm signal supplied via block 28 is cancelled in accordance with the y-branch and the counting position $T_p(m)$ of counter T is decremented by one unit in accordance with the procedure illustrated in block 35 in accordance with the expression $$T_p(m) = T_p(m) - 1 \quad (7)$$

This is repeated each time a time delay $\tau$ has elapsed after a counting position has changed or an alarm signal has been supplied, until the minimum counting position p=1 is reached. Each newcounting position $T_p(m)$ is transferred in accordance with block 30 to the local control arrangement 2 of the measuring point m−1 for adjusting the values $V_g(p)$ and G(p) at measuring point m−1 in accordance with this counting position.

It will be obvious that the procedure (5) as shown in decision diamond 26 may alternatively be effected at the measuring point m−1 instead of at the measuring point m. In that case the vehicle speed $V_c(m)$ detected at measuring point m is to be transferred to the measuring point m−1 via ring conductor 5, and the running weighted average speed $V_g(m-1)$ shall not be transferred to the measuring point m. In addition, the signal arrangement 4 provided between the measuring points m−1 and m must be connected to the local control arrangement 2 of measuring point m−1 and the counting position $T_p(m+1)$ is to be transferred to measuring point m−1.

For a decentralized control the above-mentioned method is effected in a similar way at each of the measuring points m=1, 2, . . . m−1, m, m+1, . . . N. It is however alternatively possible to perform all these methods in a central control arrangement, all vehicle detectors 3 and signalling arrangements 4 being connected directly to this central control arrangement. However, this requires a fast and consequently expensive central processor, more specifically when a large number of traffic systems must be operated simultaneously. For a decentralized control at each measuring point with a direct link between adjacent measuring points, as described above, this problem is non-existent.

What is claimed is:

1. A method of monitoring traffic in a traffic control system including at least two mutually spaced measuring points arranged along a traffic lane with a signalling means located between the measuring points, the method comprising the steps of detecting the speeds $V_c$ of vehicles passing the measuring points, determining a running weighted average speed $V_g$ from detected vehicle speeds $V_c$, determining whether a detected vehicle speed is less than a predetermined part of the running weighted average speed $V_g$, and applying an alarm signal to the signalling means when the detected vehicle speed is less than the predetermined part of the running weighted average speed $V_g$, the improvement comprising, determining a running weighted average speed $V_g(m-1)$ from vehicle speeds $V_c(m-1)$ detected at measuring point (m−1), located upstream in the traffic direction of the traffic lane, which is one of two consecutive measuring points (m−1, m) along the traffic lane and, wherein the step of determining whether the detected vehicle speed is less than a predetermined part of a running weighted average speed $V_g$, comprises comparing the speed of a vehicle $V_c(m)$ detected at the downstream measuring point (m) of the two consecutive measuring points (m−1, m) with the predetermined part of the running weighted average speed $V_g(m-1)$ determined from the vehicle speed $V_c(m-1)$ detected at the measuring point (m−1), located upstream in the traffic direction of the traffic lane, of the two consecutive measuring points (m−1, m).

2. A method as claimed in claim 1, wherein the running weighted average speed $V_g(m-1)$ is determined from the expression $$V_g(m-1)=V'_g(m-1)+a[V_c(m-1)-V'_g(m-1)]$$

wherein $V_g(m-1)$ is the new-to-be-determined running weighted average speed at the upstream measuring point (m−1), $V'_g(m-1)$ is the last-determined running weighted average speed of the upstream measuring point (m−1), $V_c(m-1)$ is the speed of a vehicle detected at the upstream measuring point (m−1) and the term a is a weighting factor to be selected.

3. A method as claimed in claim 1, including the further step of determining predetermined parts G(p) of the running weighted average speed $V_g(m-1)$ in accordance with the expression $$G(p).V_g(m-1)=F(p).V_g(m-1)/(8+M/100)$$

wherein F(p) is an adjustable multiplying factor to be selected, M is the distance between the two consecutive measuring points (m−1, m) in meters, and $V_g(m-1)$ is the running weighted average speed determined from the vehicle speeds $V_c(m-1)$ detected at the upstream measuring point (m−1) of the two consecutive measuring points (m−1, m).

4. A method as claimed in claim 1, in which the traffic control system comprises at least a third measuring point (m+1) located downstream from said two consecutive measuring points (m−1, m), further comprising the steps of incrementing a counting position T(p) by one unit as long as a maximum counting position is not reached, if an alarm signal is produced because a vehicle speed $V_c(m+1)$ detected at the third measuring point (m+1) is less than a predetermined part G(p) of the running weighted average speed $V_g(m)$ determined from the vehicle speeds $V_c(m)$ detected at the downstream measuring point (m) of said two consecutive measuring points (m−1, m), and decrementing the counting position T(p) by one unit as long as a minimum counting position has not been reached if a predetermined period of time has elapsed after the last alarm signal was produced and setting the predetermined part G(p) to previously determined values by adjusting a multiplying factor F(p) to an individual value added to each counting position T(p).

5. A method as claimed in claim 4 comprising the steps of determining whether the vehicle speed $V_c(m)$ detected at the measuring point (m) along the traffic lane is less than a given minimum vehicle speed $V_f(p)$ and applying an alarm signal to the signalling means when the detected vehicle speed $V_c(m)$ is less than the given minimum vehicle speed $V_f(p)$, the method comprising the further steps of incrementing said counting position T(p) by one unit when said alarm signal is produced and setting the minimum vehicle speed $V_f(p)$ to previously determined individual values related to each new counting position T(p).

6. A system for monitoring traffic comprising, at least two measuring points located at a mutual distance along a traffic lane, a detector for each measuring point for detecting the speeds $V_c$ of vehicles passing the measuring points, a signalling means located between the measuring points, means for determining a running weighted average speed $V_g$ from detected vehicle speed $V_c$, means for determining whether a detected vehicle speed is less than a predetermined part of the running weighted average speed $V_g$, means for applying an alarm signal to the signalling means when the detected vehicle speed is less than a predetermined part of the running weighted average speed $V_g$, wherein the means for determining a running weighted average speed $V_g$ from detected vehicle speed $V_c$ comprises means for determining a running weighted average speed $V_g(m-1)$ from the vehicle speeds $V_c(m-1)$ detected by the detector of the measuring point (m−1), located upstream in the traffic direction of the traffic lane, of two consecutive measuring points (m−1, m) located along the traffic lane, and wherein the means for determining whether a detected vehicle speed is less than a predetermined part of a running weighted average speed $V_g$ includes means for comparing the speed of a vehicle $V_c(m)$ detected by the detector of the downstream measuring point (m) with the predetermined part of the running weighted average speed $V_g(m-1)$ determined from the speed detected by the detector of the upstream measuring point (m−1).

7. A system as claimed in claim 6 wherein the means for determining the running weighted average speed $V_g(m-1)$ determines said speed in accordance with the expression $$V_g(m-1)=V'_g(m-1)+a[V_c(m-1)-V'_g(m-1)$$

wherein $V_g(m-1)$ is the new-to-be-determined running weighted average speed at the upstream measuring point (m−1), $V'_g(m-1)$ is the last-determined running weighted average speed at the upstream measuring point (m−1), $V_c(m-1)$ is the speed of a vehicle detected at the upstream measuring point (m−1) and the term a is a weighting factor to be chosen.

8. A system as claimed in claim 6 which comprises means for determining the predetermined part G(p) of the running weighted average speed $V_g(m-1)$ in accordance with the expression $$G(p).V_g(m-1)=F(p).V_g(m-1)/(8+M/100)$$

wherein F(p) is an adjustable multiplying factor to be chosen, M is the distance between the two consecutive measuring points (m−1, m) in meters and $V_g(m-1)$ is the running weighted average speed determined from the vehicle speeds $V_c(m-1)$ detected by the detector at the measuring point (m−1).

9. A system for monitoring traffic as claimed in claim 8, which comprises at least a third measuring point (m+1) located downstream relative to said two consecutive measuring points (m−1, m), means for incrementing a counting position T(p) of a counter by one unit as long as a maximum counting position has not been reached, if an alarm signal is produced because a vehicle speed $V_c(m+1)$ detected by a detector at the third measuring point (m+1) is less than the predetermined part G(p) of the running weighted average speed $V_g(m)$ determined from the vehicle speeds $V_c(m)$ detected by the detector at the measuring point (m), means for decrementing the counting position T(p) by one unit as long as a minimum counting position has not been reached, if a predetermined time $\tau$ elapsed after the last alarm signal was supplied or after changing of the counting position, respectively, and means for adjusting the predetermined part G(p) to predetermined values by adjusting the multiplying factor F(p) to an individual value added to each counting position.

10. A system as claimed in claim 9, comprising means for determining whether the vehicle speed $V_c(m)$ measured at the measuring point (m) is less than a given minimum vehicle speed $V_c(p)$, means for applying an alarm signal to the signalling means when the detected vehicle speed $V_c(m)$ is less than the given minimum vehicle speed $V_f(p)$, wherein the means for increasing said counting position T(p) increment the counting position by one unit when an alarm signal is produced when the detected vehicle speed $V_c(m)$ is less than the given minimum vehicle speed $V_f(p)$, and means for setting the the minimum vehicle speed $V_f(p)$ to predetermined values at an individual value added to each counting position T(p).

11. A method of monitoring traffic in a traffic control system that includes at least two consecutive spaced apart measuring points (m−1, m) located along a traffic lane and with a signal means located between the measuring points, the method comprising:

detecting the speed $V_c$ of vehicles passing the measuring points, determining a running weighted average speed $V_g$ from detected vehicle speeds $V_c$, determining whether a detected vehicle speed is less than a predetermined part of the running weighted average speed $V_g$, wherein the improvement comprises determining a running weighted average speed $V_g(m-1)$ from vehicle speeds $V_c(m-1)$ detected at the measuring point (m−1) located upstream in the traffic direction of said two consecutive measuring points (m−1, m) along the traffic lane, wherein the step of determining whether the detected vehicle speed is less than the predetermined part of the running weighted average speed $V_g$ comprises comparing the speed of a vehicle $V_c(m)$ detected at the downstream measuring point (m) with the predetermined part of the running weighted average speed $V_g(m-1)$ determined from the vehicle speed $V_c(m-1)$ detected at the measuring point (m−1), and generating an alarm signal for controlling the traffic control system when the detected vehicle speed is less than the predetermined part of the running weighted average speed $V_g$.

* * * * *